Dec. 23, 1930.　　　D. R. FRANCIS　　　1,785,733
CONTROL MEANS FOR VARIABLE SPEED TRANSMISSIONS
Filed July 24, 1929　　　2 Sheets-Sheet 1
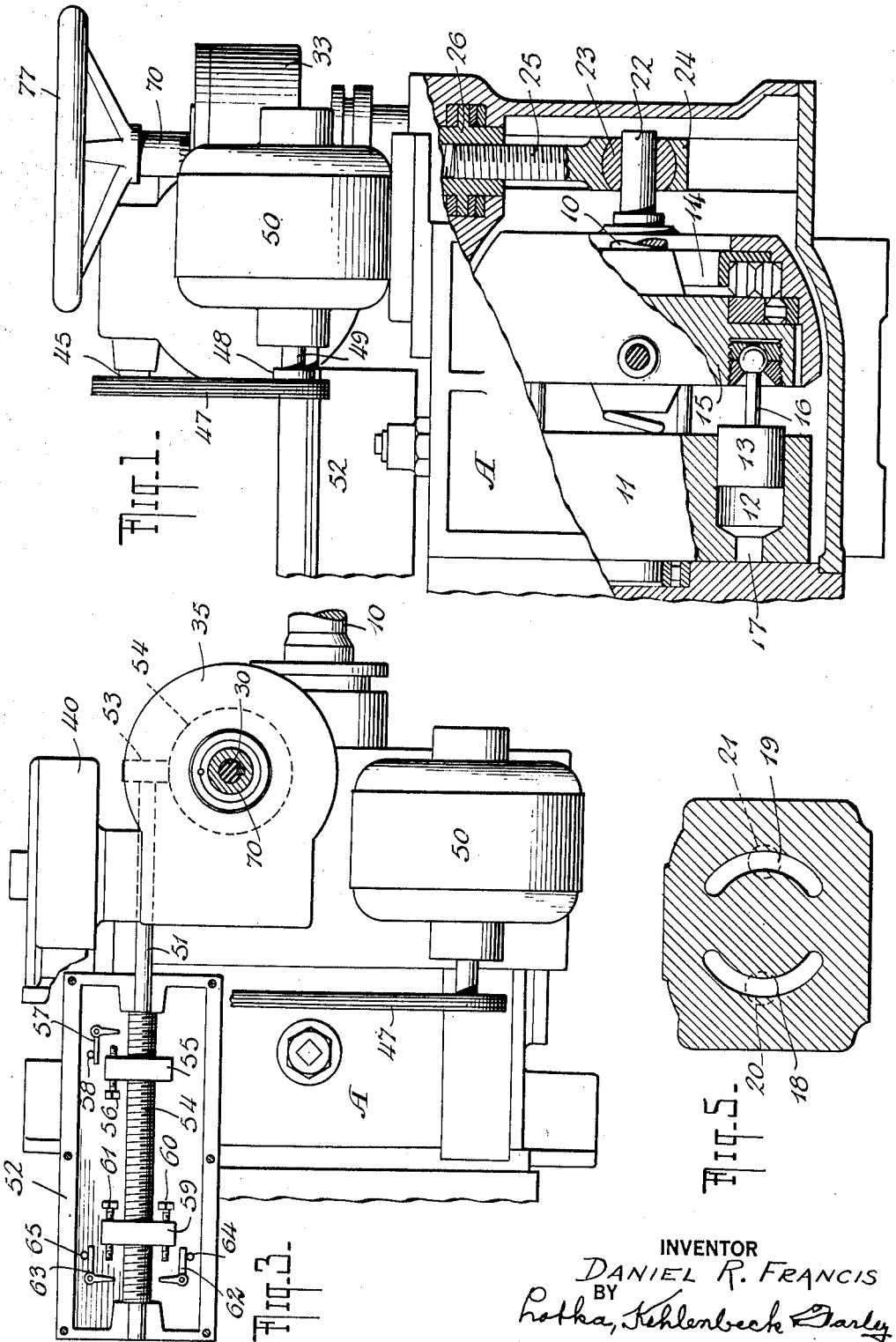
INVENTOR
DANIEL R. FRANCIS
BY
Lotka, Kehlenbeck & Darby
ATTORNEYS Dec. 23, 1930.    D. R. FRANCIS    1,785,733
CONTROL MEANS FOR VARIABLE SPEED TRANSMISSIONS
Filed July 24, 1929    2 Sheets-Sheet 2
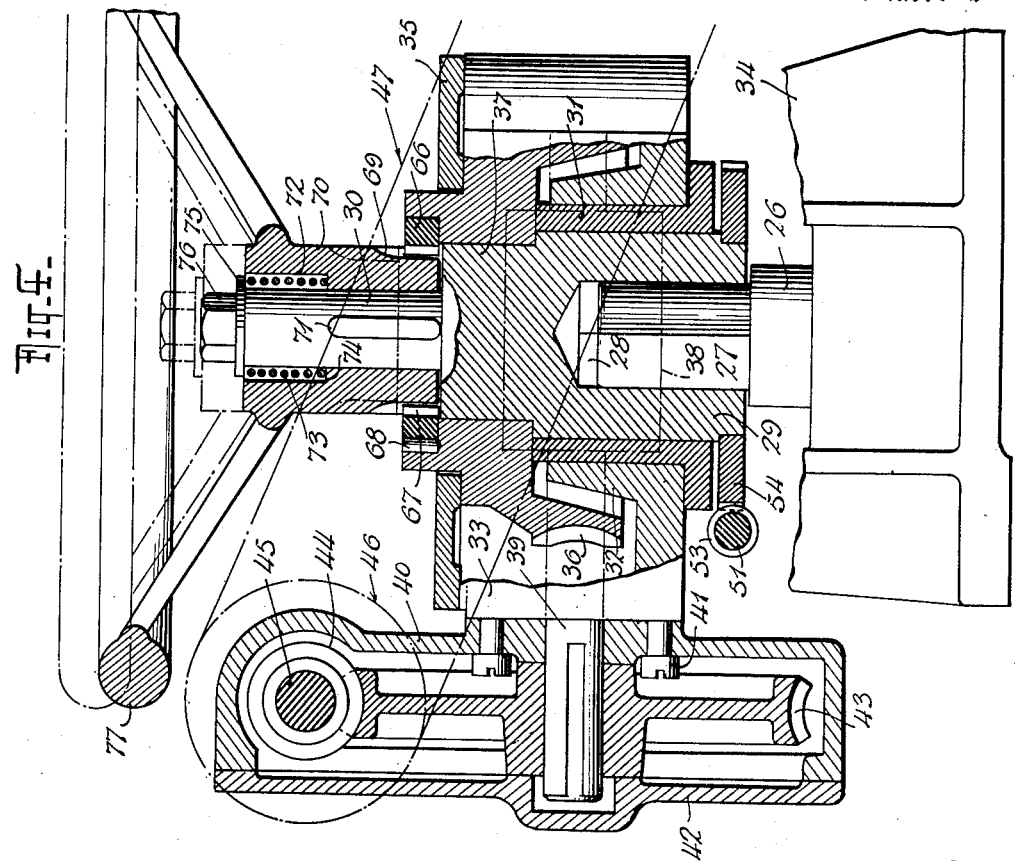
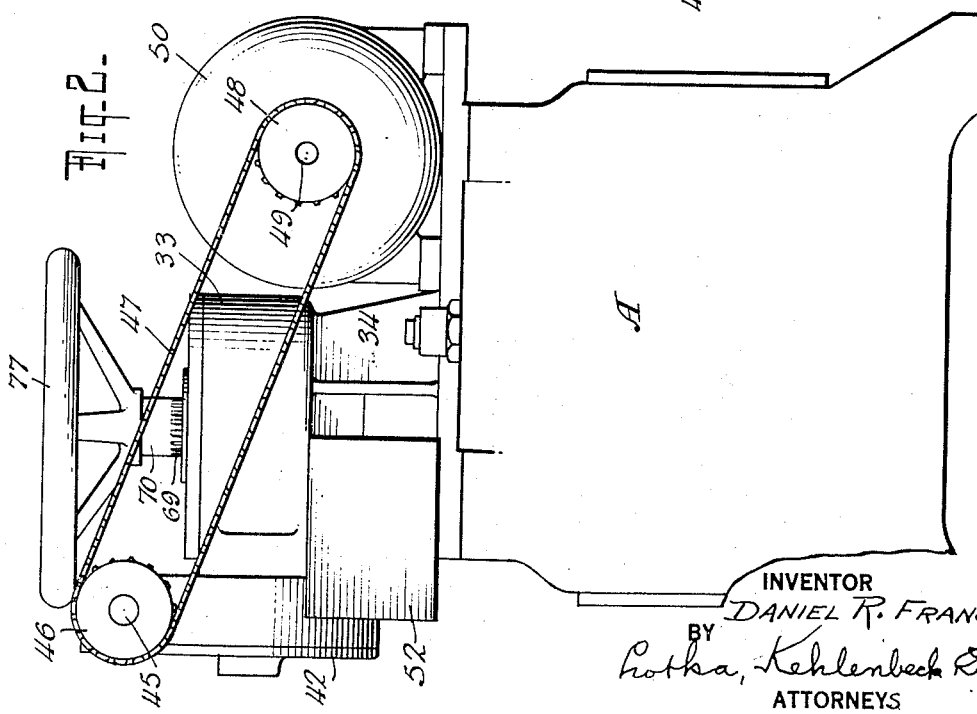
INVENTOR
DANIEL R. FRANCIS
BY
ATTORNEYS Patented Dec. 23, 1930

1,785,733

UNITED STATES PATENT OFFICE

DANIEL R. FRANCIS, OF WATERBURY, CONNECTICUT, ASSIGNOR TO THE WATERBURY TOOL COMPANY, OF WATERBURY, CONNECTICUT, A CORPORATION OF CONNECTICUT

CONTROL MEANS FOR VARIABLE-SPEED TRANSMISSIONS

Application filed July 24, 1929. Serial No. 380,474.

The invention relates to variable speed transmissions and more particularly to hydraulic variable speed gears of the type shown in United States patent to Harvey D. Williams No. 925,148 of June 15, 1909.

In many mechanical installations, the speed of operation is of great importance, and it is essential to the production of uniform and efficient results that this speed vary only as it is intentionally desired to vary the same, and that complete and accurate control of said speed or any desired changes therein may be maintained and effected in a simple and reliable manner. The use of hydraulic variable speed transmissions in such mechanical installations has many advantages because of the fact that gradual speed changes may be secured with such transmissions without abrupt and sudden variations such as are inherent in the utilization of other types of transmissions. To secure the best results with such hydraulic transmissions, it is desirable to control the same in an effective manner, in order that the wide range of speed changes of which such hydraulic transmissions are capable may be utilized with maximum efficiency.

The object of the instant invention is to provide a control means which is arranged to be automatically operated by suitable electric or other power, and which is capable of being manually operated at will, independently of the automatically operated mechanism. The invention contemplates also the provision of limit means such as limit switches in combination with the novel control means to prevent overrun thereof. Other objects will appear from the description hereinafter, and the features of novelty will be pointed out in the claims.

In the accompanying drawings, which illustrate an example of the invention without defining its limits, Fig. 1 is a side elevation of a hydraulic variable transmission embodying the novel features; Fig. 2 is an end elevation thereof; Fig. 3 is a plan view; Fig. 4 is a fragmentary sectional view of the control means on an enlarged scale, and Fig. 5 is a detail view illustrating valve ports included in the transmission.

As shown in the drawings, the reference character A indicates a pump, or as it is commonly called the A-end of a hydraulic speed transmission or gear, of the type shown in the patent to Williams above referred to. The shaft 10 of the pump which may be driven by any suitable means, such as an electric motor, is suitably journalled in the pump casing and has secured to rotate with it a barrel 11. Formed within the barrel 11, is a plurality of cylinders 12 in which pistons 13 are adapted to reciprocate, the stroke of which and consequently the amount of fluid pumped for each rotation of the shaft 10 and barrel 11, depends upon the inclination of a box 14, in which is rotatably mounted a swash plate 15. The latter is connected with the pistons 13 by the piston rods 16, so that as the shaft 10 is rotated and the pistons are caused to reciprocate, said pistons will suck or force oil through the cylinder ports 17 which are adapted to align alternately, as the barrel 11 rotates, with the arcuate ports 18, 19 (see Fig. 5) formed in the end of the pump casing. One of said arcuate ports, for example, the port 18 is the pressure port and the other is the suction port. These arcuate ports are connected by means of the pipes 20 and 21 with a motor (not shown) the construction of which is similar to that of the pump, it being understood that the motor may be connected in any convenient manner with the mechanism to be driven.

The construction of pump-motor combinations of this character is well known and in such combinations, the passage of the fluid under pressure from the pump, to and through the motors, produces in the latter, the reciprocation of pistons similar to the pistons 13, thereby causing the rotation of the barrel and driven shaft of the motor by means of the connection of the motor pistons with an inclined rotatably mounted swash plate, similar to the swash plate 15. In accordance with the usual practice, the swash plates of the motors are preferably held at a fixed angle, while the inclinations of the swash plates of the pumps are variable.

For the purpose of varying the inclination of the box 14 and swash plate 15, the box 14 may be provided with a lateral projection in the form of a stub axle or pin 22, which is slidably mounted in a central aperture, provided in a spherical bearing 23, rotatable within a similarly shaped seat in a bearing block 24, formed on the lower end of a screw threaded rod or spindle 25; said bearing block 24 being guided for vertical movement in suitable guide ways, formed on the inner wall of the pump casing. The spindle 25 engages within the internally threaded lower end of a control shaft 26, mounted for rotation, but held against longitudinal movement in any convenient manner within the pump casing, said control shaft 26, projecting outwardly beyond the pump casing and having its outer end 27 reduced and preferably of square or other non-circular cross-section.

The end of the control shaft 26 is fitted into a correspondingly shaped socket 28 of a head or coupling member 29 which at its outer or upper end is provided with an integral stud 30 of cylindrical form projecting axially outward from said head 29, as shown in Fig. 4. The head 29 is rotatably mounted in a bushing 31 secured in any conventional manner within a bearing 32 forming part of a main gear case 33 which is suitably supported upon the pump casing for instance by means of brackets 34 and preferably is provided with a removable cover 35 to render the interior of said gear case 33 easily accessible, as illustrated in Fig. 4. Within the gear case 33 is located a worm gear 36 or its equivalent which is loosely mounted upon the relatively reduced portion 37 of the head 29, and meshes with a worm pinion 38 fixed upon a gear shaft 39 suitably journalled in said gear case 33. The gear shaft 39 projects outwardly beyond the gear case 33 in a direction transverse to the axis of the control shaft 20 so as to terminate within an auxiliary gear case 40 secured to the gear case 33 in any conventional manner as by screw bolts 41; in the preferred arrangement the interior of the auxiliary gear case 40 is made easily accessible by means of a removable cover 42 with which said auxiliary gear case 40 is provided, as illustrated in Fig. 4.

Within the auxiliary gear case 40 the gear shaft 39 carries a worm gear 43 or its equivalent suitably mounted to rotate therewith and meshing with a worm pinion 44 or equivalent gear secured upon a driven shaft 45; the latter is suitably journalled in the auxiliary gear case 40 and projects outwardly beyond the same as illustrated in Fig. 1. The external portion of the driven shaft 45 is connected in any suitable manner with a source of power, and in the illustrated example accordingly is provided with a sprocket wheel 46 which is connected, preferably by means of a roller chain 47 with a second sprocket 48 fixed upon the shaft 49 of an electric motor 50; the latter is of the reversible type and may be located in any convenient manner, but preferably is fixed upon the pump casing as shown in the drawings.

The motor 50 and its associated gearing together with the head 29 constitutes the means whereby the control means of the pump is automatically operated, and it will be understood that this automatic means may be otherwise constructed and arranged and otherwise operated than as shown without departing from the spirit of the invention. With the illustrated arrangement it will be obvious, as the motor 50 is operated that power will be transmitted by the sprockets 48—46 and chain 47, or their equivalents, to rotate the driven shaft 45; the latter, through the medium of the worm gearing 44—43—38—39, or equivalent transmission means, will accordingly automatically rotate the head 29 and the control shaft 26.

As the latter is thus operated, in one direction or the other, the spindle 25 will be raised or lowered because of its screwthreaded connection with the control shaft 26 and will correspondingly raise or lower the bearing block 24 in its guideways. As this occurs the box 14 and swash plate 15 will be adjusted to different positions, and to varying degrees of inclination to thereby vary the effective speed of the pump and to correspondingly vary the speed of operation of the co-operating motor or B-end in the well known way. It will be understood that the operation of the electric motor 50 is controlled in the customary manner by means of suitable switches or push buttons.

To avoid the possibility that the electric motor 50 may over-run the control in either direction in case the aforesaid switches or push buttons are unintentionally left closed, or in case the system should be short circuited, limit switches of suitable form and construction are provided in the novel arrangement. In the illustrated example the limit switch comprises a shaft 51 journalled in a conventional switch box 52 suitably supported in co-operative relation to the associated elements and carrying a spiral pinion 53 which meshes with a spiral gear 54 suitably fixed upon the head 29 to rotate therewith as illustrated in Fig. 4. Within the switch box 52 the shaft 51 is screwthreaded as indicated at 54 and on this threaded portion carries a nut 55 which is prevented from rotating with said shaft and accordingly moves lengthwise of said threaded portion and of the switch box 52 as the shaft 51 is rotated. The nut 55 carries an adjustable set screw 56 arranged to engage a pivoted bell-crank lever 57 mounted within the box 52 and thereby separate the contacts 58 and break the circuit in which the latter are located. In some instances the limit switch may operate in both directions, in which case a second nut 59, similar to the nut 55, is provided on the threaded portion 54 of the shaft 51. The nut 59, as shown, may be provided with two adjustable set screws 60 and 61 adapted to respectively engage lever 62 and 63 pivoted within the box 52 to respectively open each pair of contacts 64 and 65 and to thereby break the circuits in which said contacts are located. Obviously the set screws 56, 60 and 61 may be adjusted to break the respective circuits in successive sequence or simultaneously or in any other desired manner.

Under certain conditions, as for instance in cases of emergency, it is desirable and sometimes even imperative to be able to manually operate the control means, which manual operation is ofttimes required to be carried out as speedily as possible. Obviously the desired results are difficult, if not impossible of attainment, unless some provision is made to disengage the gearing which forms part of the automatic controlling means. Heretofore it has been necessary to first loosen a plurality of screws and to perform other time and energy consuming operations before the desired and necessary disconnection of the gearing could be effected.

To overcome these objections and to provide an arrangement whereby manual operation of the control means may be carried out with a minimum of effort and in a minimum of time, the gearing forming part of the automatic means includes one element or member which may be easily shifted to break the train of gearing and at the same time to provide the medium whereby the aforesaid manual operation of the control means may be easily and quickly accomplished.

In the illustrated example the worm gear 36 accordingly is loosely mounted upon the portion 37 of the head 29 and projects axially outward beyond the gear case 33 and through a suitable opening provided in the cover 35 thereof. At its outer end the worm gear 36 is recessed for the accommodation of an annular member 66 provided upon its interior periphery with teeth 67 to form what amounts to an internal gear; the annular member 66 is secured in its recess to rotate with the worm gear 36 in any suitable manner as by means of a key or pin 68. The teeth 67 of the annular member 66 normally are in mesh with corresponding gear teeth 69 formed upon the outer peripheral surface of a sleeve 70. The latter is mounted upon the stud 30 so as to rotate therewith and so as to be capable of sliding lengthwise of said stud without breaking its coupling or connection therewith; the aforesaid connection between the sleeve 70 and the stud 30 may be effected in any conventional manner as by means of a key 71 located on the stud 30 and fitting into a co-operating keyway on the sleeve 70. With this arrangement the sleeve 70 with its teeth 69 normally constitutes an element of the train of gearing forming part of the means for automatically operating the control means, in which train the annular member 66 with its teeth 67 is also located. At its upper or outer end the sleeve 70 is provided with a recess 72 for the reception of a coil spring 73 which bears with its one end against the shoulder 74 formed by the bottom of the recess 72, and at its other end engages a washer 75 or equivalent stop secured upon the end face of the stud 30 by means of a bolt or the like 76, as shown in Fig. 4. The arrangement is such that the tension of the spring 73 tends to maintain the sleeve 70 in its normal position in which the teeth 69 are in mesh with the teeth 67 of the internal gear 66, and to return said sleeve to such normal position. To facilitate the manipulation of the sleeve 70 and the manual operation thereby of the control means, said sleeve 70 is provided with a suitable operating member, for instance, by being cast as an integral part of a hand wheel 77, or is otherwise provided with an equivalent device.

In practice, under ordinary and normal conditions, the control means of the pump A will be automatically operated by the electric motor 50 or equivalent power device, and its associated elements, in the manner previously set forth herein.

If, because of extraordinary conditions such as an emergency, it is desirable or necessary to manually operate said control means, an outward pull is exerted upon the hand wheel 77 or its equivalent to shift the sleeve 70 lengthwise of the stud 30 against the tension of the spring 73 to the position indicated by dotted lines in Fig. 4. When the parts are thus adjusted the gear teeth 69 of the sleeve 70 will no longer be in mesh with the teeth 67, although the sleeve 70 will still remain in coupled connection with the stud 30 through the medium of the key 71 and its co-operating keyway on the sleeve 70; it will be understood that the keyway of the sleeve 70 slides lengthwise of the key 71 as the sleeve 70 changes its position on the stud 30. In other words, with the described outward adjustment of the sleeve 70 the train of gearing which forms a part of the mechanism for automatically operating the control means is broken, due to the fact, that in effect one of the elements or gears of said train is shifted out of the same. At the same time the gear which is shifted remains in operative connection with said control means, and as said gear includes means whereby rotative power may be manually applied thereto, it is possible to manually actuate the control shaft 26 and thereby manually adjust the position of the box 14 and swash plate 15 to adjust the speed of the pump A at will. Because of the breaking of the train of gearing, as above set forth, the aforesaid manual operation of the control means may be quickly effected with a minimum of effort and without requiring the aforesaid train of gearing and its associated elements to be operated; in other words, the manual operation is independent of the automatic operation. As soon as the hand wheel 77 or its equivalent is released, the spring 73 will force the sleeve 70 back to its normal position in which the gear teeth 69 are in mesh with the teeth 67, whereby the continuity of the aforesaid train of gearing is restored to again permit the control means to be automatically operated.

In either case, whether the control means is automatically or manually operated, the gears 54 and 53 will remain in mesh with each other so that the shaft 51 will be rotated to operate the limit switch or switches.

The novel arrangement herein set forth may be used as a single unit or several may be used together as a sectional control, in which case the electric motor 50 or its equivalent would be suitably connected with all of the units of the installation to effect the desired automatic control. In such cases, because of the independence of the manually operated means, individual manual control of the various units would still be possible.

The construction is simple and easily operated and does away with the necessity for the loosening of screws or for any other time and energy consuming operations, when a need for manual operation of the control means suddenly arises for any reason.

Various changes in the specific form shown and described may be made within the scope of the claims without departing from the spirit of the invention.

I claim:—

1. The combination of a variable speed gear having a swash plate adapted to be adjusted to different inclined positions to vary the effective speed of said gear, control means for changing the angle of inclination of said swash plate, a coupling member connected with said control means, means for automatically operating said control means, means for manually operating said control means independently of said automatic means, and a connection whereby the operative movements of both the automatic and manually operated means are transmitted to the coupling member and to the control means.

2. The combination of a variable speed gear having a swash plate adapted to be adjusted to different inclined positions to vary the effective speed of said gear, control means for changing the angle of inclination of said swash plate, a coupling member connected with said control means to move therewith, automatic means, including a train of gears, for automatically operating said control means, manually operated means connected with an element of said train of gears whereby said element may be manually shifted out of said train, and whereby said control means may be manually operated independently of said automatic means, and a connection between said manually operated means and said coupling member effective to transmit the operative movements of both the automatic and manually operated means to said control means through said coupling member.

3. In a hydraulic variable speed gear, the combination of a casing, a swash plate within said casing adapted to be adjusted to different positions to vary the effective speed of said gear, a control shaft mounted within said casing and having a non-circular end portion projecting exteriorly thereof, connections between said control shaft and swash plate whereby the position of the latter is varied as said control shaft is operated, a train of gearing mounted in said two gear cases, a coupling member fitted upon said non-circular end portion of the control shaft, a main gear case in which said coupling member is mounted, an auxiliary gear case carried by said main gear case, a motor for actuating said train of gears to automatically operate said control shaft, a support common to said main and auxiliary gear cases and said motor for mounting the same on said casing, an operating member connected with an element of said train of gears for manually shifting said element out of said train and for manually operating said control shaft independently of said motor and train of gears and a connection between said operating members and coupling member effective to transmit the movements of both the motor driven train of gears and the manually actuated operating member to said control shaft.

4. In a hydraulic variable speed gear, the combination of a casing, a swash plate within said casing adapted to be adjusted to different positions to vary the effective speed of said gear, a control shaft mounted within said casing and having a non-circular end portion projecting exteriorly thereof, connections between said control shaft and swash plate whereby the position of the latter is varied as said control shaft is operated, a coupling member fitted upon said non-circular end portion of the control shaft, a main gear case in which said coupling member is mounted, an auxiliary gear case carried by said main gear case, a train of gearing mounted in said two gear cases, an electric motor mounted on said casing for actuating said train of gears to automatically operate said control shaft, a support common to said main and auxiliary gear cases and said motor for mounting the same on said casing, an operating member connected with an element of said train of gears for manually shifting said element out of said train and for manually operating said control shaft independently of said electric motor and train of gears, and a connection between said operating members and coupling member effective to transmit the movements of both the motor driven train of gears and the manually actuated operating member to said control shaft, and a limit switch carried by said common support in constant connection with said control shaft for preventing overrun of the control during the operation of the control shaft.

5. In a hydraulic variable speed gear, the combination of a casing, a swash plate within said casing adapted to be adjusted to different positions to vary the effective speed of said gear, a control shaft mounted within said casing and projecting exteriorly thereof, connections between said control shaft and swash plate whereby the position of the latter is varied as said control shaft is operated, a gear case mounted upon said casing, a coupling head journalled in said gear case and fitted upon said control shaft to rotate therewith, a gear loosely mounted upon said head within said gear case, a motor operatively connected with said gear for automatically operating said control shaft, a stud projecting axially from and forming part of said head, an internal gear forming part of said loosely mounted gear, a sleeve slidable lengthwise of said stud and connected to rotate therewith in all positions of said sleeve, gear teeth on said sleeve normally arranged in mesh with said internal gear whereby rotation of said loosely mounted gear by said motor is transmitted to said control shaft, and a hand wheel carried by said sleeve for slidably shifting the latter on said stud to disconnect the gear teeth of said sleeve from said internal gear and for manually operating said control shaft.

6. In a hydraulic variable speed gear, the combination of a casing, a swash plate within said casing adapted to be adjusted to different positions to vary the effective speed of said gear, a control shaft mounted within said casing and projecting exteriorly thereof, connections between said control shaft and swash plate whereby the position of the latter is varied as said control shaft is operated, a gear case mounted upon said casing, a coupling head journalled in said gear case and fitted upon said control shaft to rotate therewith, a gear loosely mounted upon said head within said gear case, gearing connected with said loosely mounted gear, an electric motor for actuating said gearing to automatically operate said control shaft, an annular internal gear carried by said loosely mounted gear, a stud forming part of said head and projecting axially therefrom through said internal gear, a sleeve slidably mounted on said stud, means whereby said stud is coupled to said sleeve in all positions of the latter, gear teeth on said sleeve normally arranged in mesh with said internal gear whereby rotation of said loosely mounted gear by said gearing and motor is transmitted to said control shaft, a hand wheel carried by said sleeve for slidably shifting the latter on said stud to disconnect the gear teeth of said sleeve from said internal gear and for manually operating said control shaft, and a spring for maintaining said sleeve in its normal position and for returning it thereto.

7. In a hydraulic variable speed gear, the combination of a casing, a swash plate within said casing adapted to be adjusted to different positions to vary the effective speed of said gear, a control shaft mounted within said casing and projecting exteriorly thereof, connections between said control shaft and swash plate whereby the position of the latter is varied as said control shaft is operated, a gear case mounted upon said casing, a coupling head journalled in said gear case and fitted upon said control shaft to rotate therewith, a gear loosely mounted upon said head within said gear case, gearing connected with said loosely mounted gear, an electric motor for actuating said gearing to automatically operate said control shaft, an annular internal gear carried by said loosely mounted gear, a stud forming part of said head and projecting axially therefrom through said internal gear, a sleeve slidably mounted on said stud, means whereby said stud is coupled to said sleeve in all positions of the latter, gear teeth on said sleeve normally arranged in mesh with said internal gear whereby rotation of said loosely mounted gear by said gearing and motor is transmitted to said control shaft, a hand wheel carried by said sleeve for slidably shifting the latter on said stud to disconnect the gear teeth of said sleeve from said internal gear and for manually operating said control shaft, a spring maintaining said sleeve in its normal position and for returning it thereto, and a limit switch in constant connection with said control shaft for preventing overrun of the control during the operation of said control shaft.

8. The combination of a control shaft for selectively adjusting the operative speed of a mechanism, said control shaft having its one end of non-circular cross section, automatic means, including a train of gears, fitted upon said non-circular end of said control shaft for automatically operating the same, and manually operable means normally included in said automatic means whereby said train of gears may be broken at will for manually adjusting said control shaft.

9. The combination of a control shaft for selectively adjusting the operative speed of a mechanism, a coupling member fitted upon said control shaft to rotate therewith, automatic means, including a train of gears for automatically operating said control shaft, manually operable means normally included in said automatic means whereby said train of gears may be broken at will to permit an independent manual adjustment of said control shaft, and a connection between said manually operable means and said coupling effective to transmit the operative movements of both the automatic and manually operable means to said control shaft.

10. The combination of a control shaft for selectively adjusting the operative speed of a mechanism, said control shaft having its one end of non-circular cross section, a coupling member fitted upon said non-circular end of said control shaft, automatic means, including a train of gears, for automatically operating said control shaft, manually operable means connected with an element of said train of gears whereby said element may be shifted out of said train to permit a manual operation of said control shaft independently of said automatic means, and a connection between said manually operable means and said coupling effective to transmit the operative movements of both the automatic and manually operable means to said control shaft.

In testimony whereof I have hereunto set my hand.

DANIEL R. FRANCIS.